United States Patent [19]

Fukami et al.

[11] Patent Number: 4,802,172
[45] Date of Patent: Jan. 31, 1989

[54] DECODING APPARATUS

[75] Inventors: Tadashi Fukami; Shinya Ozaki, both of Kanagawa; Kentaro Odaka, Tokyo, all of Japan

[73] Assignee: Sony Corporation, Tokyo, Japan

[21] Appl. No.: 19,583

[22] Filed: Feb. 27, 1987

[30] Foreign Application Priority Data

Feb. 28, 1986 [JP] Japan ............... 61-43274

[51] Int. Cl.⁴ .................. G06F 11/10; G11B 5/00
[52] U.S. Cl. ........................ 371/38; 360/53; 360/32
[58] Field of Search ............. 371/38, 39, 40; 360/32, 360/53

[56] References Cited

U.S. PATENT DOCUMENTS 4,446,490 5/1984 Hoshimi et al. ............... 360/32
4,523,237 6/1985 Fukuda et al. ................ 360/8
4,622,600 11/1986 Okamoto et al. .............. 360/32
4,628,373 12/1986 Takahashi et al. ............. 360/32

Primary Examiner—Charles E. Atkinson
Attorney, Agent, or Firm—Philip M. Shaw, Jr.

[57] ABSTRACT

A decoding apparatus in which the operation to write error correction coded data into a memory and a decoding processing operation of the data read out of the memory are executed in parallel. This decoding apparatus comprises: a comparator for comparing the address to write the data into the memory with the address in the memory for the decoding processing operation; and control means for inhibiting the writing operation when it is detected by the comparator that the decoding processing operation is precedent to the writing operation. With this apparatus, the data which was subjected to the correcting process is prevented from being rewritten into the memory and the pointer derived by the decoding process from being broken.

7 Claims, 5 Drawing Sheets

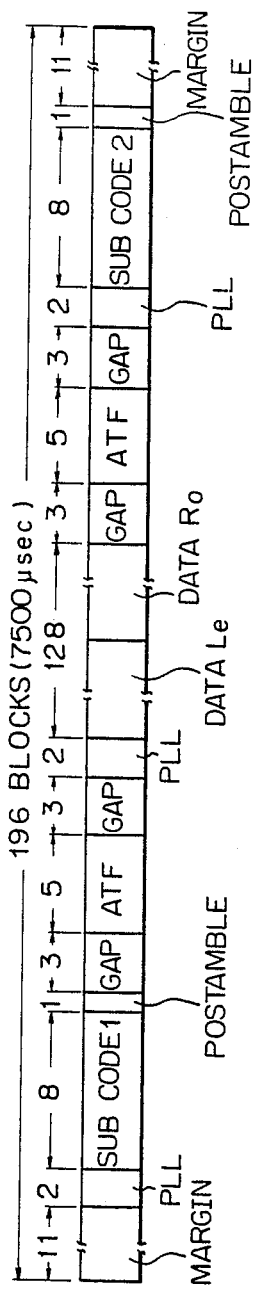
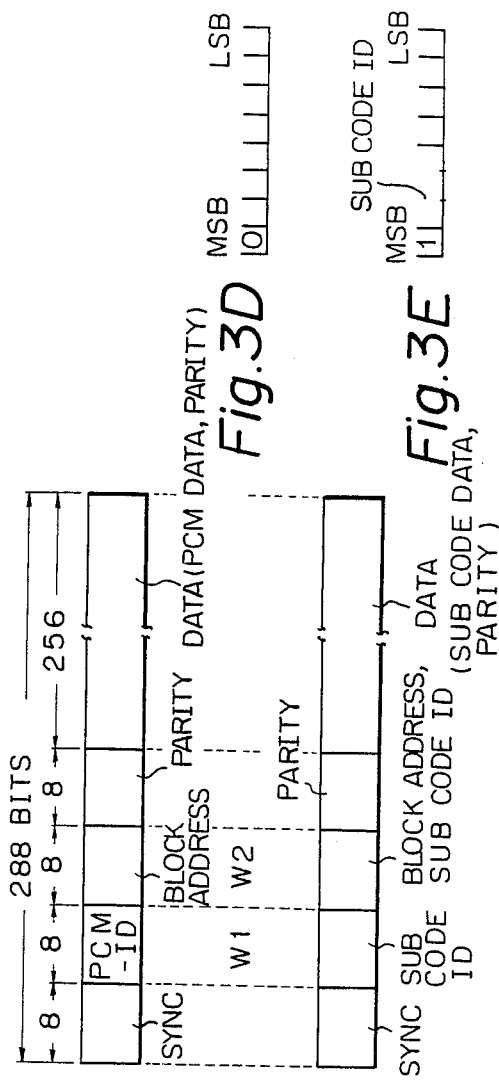
Fig. 3A
Fig. 3B
Fig. 3C
Fig. 3D
Fig. 3E

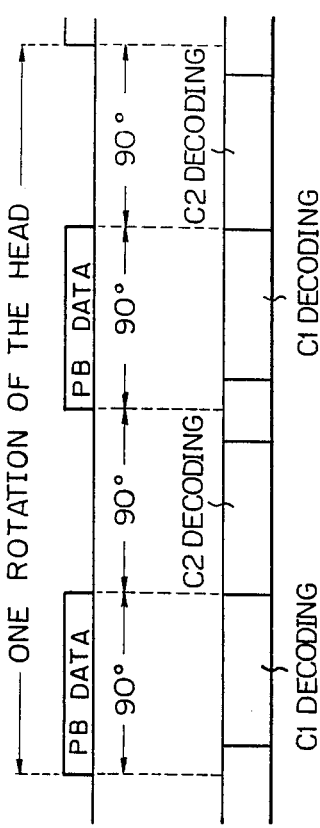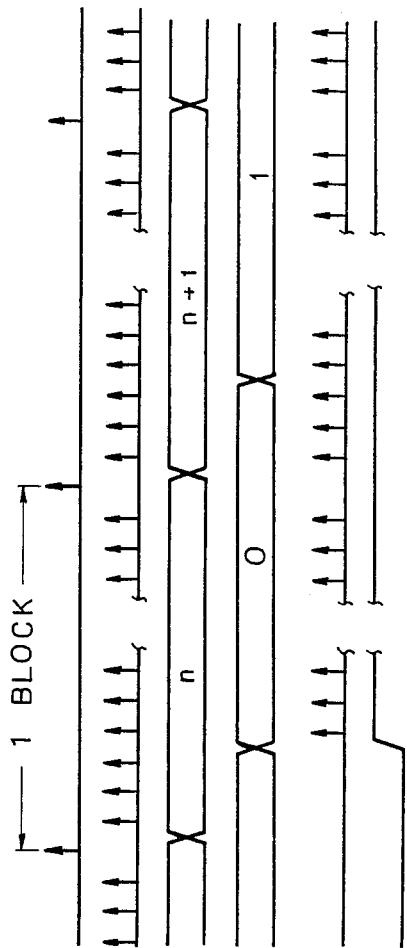

DECODING APPARATUS

FIELD OF THE INVENTION

The present invention relates to a decoding apparatus and, more particularly, to an apparatus for decoding error correction coded data.

DESCRIPTION OF RELATED BACKGROUND ART

An apparatus for recording and reproducing digital audio signals (referred to as PCM signals) by a pair of rotary heads is disclosed in, for example, U.S. Pat. No. 4,523,237 by the same applicant as the present invention. In that apparatus an error correction code is used such that the PCM signals of the amount to be recorded and reproduced by one rotary head are arranged in a matrix form, an error correction coding process $C_1$ is performed for each PCM signal arranged in the vertical direction of the matrix arrangement, and an error correction coding process $C_2$ is executed for each PCM signal arranged in the lateral direction of the matrix arrangement. The PCM signal which was subjected to the error correction coding process and the vertically arranged check symbol of the error correction code $C_1$ is recorded and reproduced as a unit. Similarly, the PCM signal which was subjected to the error correction coding process and the vertically arranged check symbol of the error correction code $C_2$ is also recorded and reproduced as a unit. To error correct the reproduced signal, decoding of the error correction code $C_1$ ($C_1$ decoding) is performed and the decoding of the error correction code $C_2$ ($C_2$ decoding) is then executed.

When performing the $C_1$ and $C_2$ decoding, one matrix and the corresponding reproduced data are written into the buffer memory. Next, the data read out of the buffer memory for each series of the code $C_1$ is subjected to the error correcting process and a corrected data and the pointer indicative of the presence or absence of errors are written into the buffer memory ($C_1$ decoding). The data which is stored in the buffer memory and was subjected to the $C_1$ decoding and the pointer are read out for each series of the code $C_2$, the data which was read out is subjected to the error correcting process, and the corrected data and the pointer are written into the buffer memory ($C_2$ decoding). The PCM data which was subjected to $C_1$ and $C_2$ decoding and the pointers are finally read out of the buffer memory in accordance with the inherent order of the data and the error data is interpolated by an interpolating circuit in a known manner.

In the foregoing decoding processes, after the reproduced data was once stored into the buffer memory, the $C_1$ decoding and $C_2$ decoding are executed. However, it takes a predetermined period of time to perform the $C_1$ and $C_2$ decoding. If the decoding is performed after the reproduced data was once stored into the buffer memory, the decoding cannot be sufficiently executed.

SUMMARY OF THE INVENTION

It is, therefore, an object of the present invention to provide a decoding apparatus which can prevent the corrected PCM data or pointers stored in a buffer memory from being broken by the reproduced data.

According to the present invention, this object is accomplished by a decoding apparatus for decoding input data which was error correction coded, comprising:
a decoding apparatus for decoding input data which was error correction coded, comprising:
memory means for storing data;
writing means for writing said input data into said memory means;
detecting means supplied with said for detecting a write address having a first predetermined numerical magnitude and supplying the detected write address to the writing means to cause it to write the input data into said memory means at the detected write address;
decoding means for producing a decoding address having a second predetermined numerical magnitude, reading out the data stored in said memory means at said decoding address, and decoding the read out data; the numerical
comparing means for comparing the numerical magnitude of said write address with that of said decoding address; and
control means connected to said comparing means and said writing means for inhibiting the writing means from writing the input data into said memory means when it is detected by said comparing means that the numerical magnitude of the decoding address is not less than that of said write address.

BRIEF DESCRIPTION OF THE DRAWINGS

FIGS. 3A to 3E are schematic diagrams for explaining a track format and a block format of the digital tape recorder;

FIG. 5 is a block diagram of the main portion of an embodiment of the present invention;

FIGS. 7A to 7F are time charts for explaining the decoding operation.

DESCRIPTION OF A PREFERRED EMBODIMENT

Figure 1:
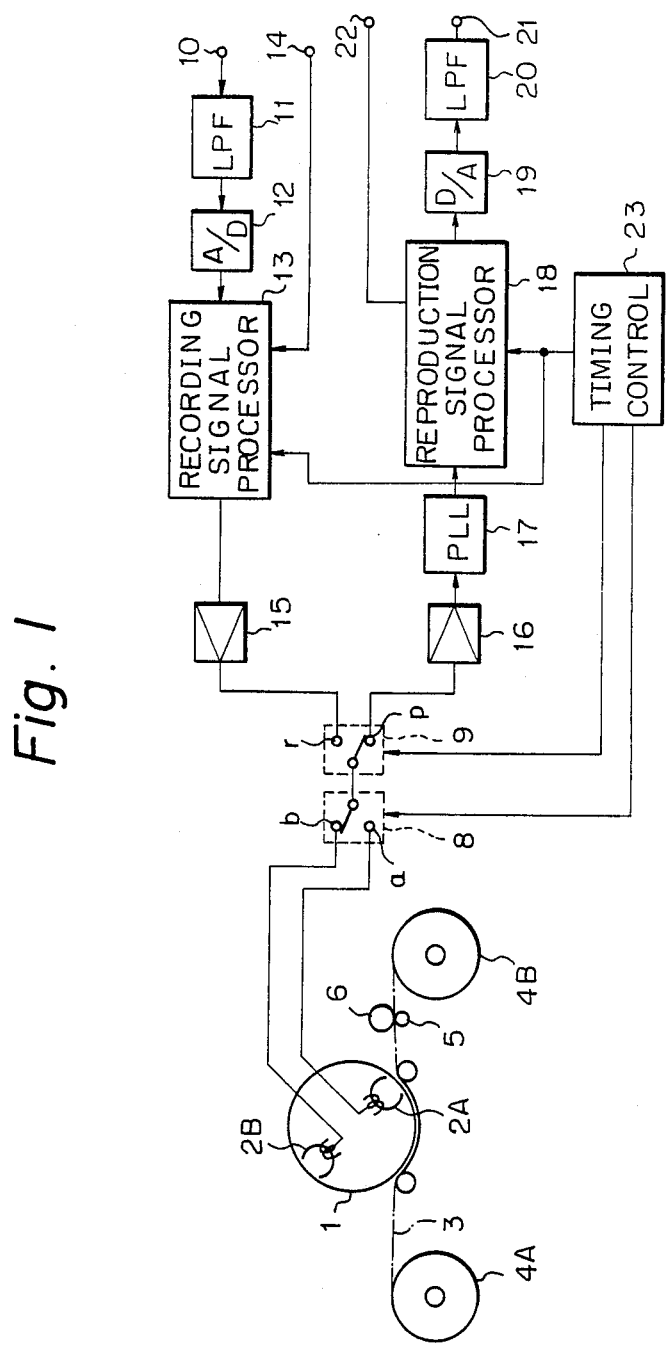
FIG. 1 is a block diagram showing an overall constitution of a digital tape recorder of the rotary head type to which the present invention can be applied.

An embodiment in which the present invention is applied to a digital tape recorder of the rotary head type (abbreviated to an RDAT) will be described hereinbelow with reference to the drawings in accordance with the following order.

a. Overall constitution of the digital tape recorder;
b. Data constitution of the digital tape recorder;
c. Error correction codes of the digital tape recorder; and
d. Reproduction signal processor.

a. Overall constitution of the digital tape recorder:

FIG. 1 shows an overall constitution of the rotary head type digital tape recorder (i.e., RDAT). In the diagram, reference numeral 1 denotes a drum having a diameter of 30 mm which is rotated at a speed of 2000 r.p.m. A pair of magnetic heads 2A and 2B are attached to the drum 1 with an angular interval of 180°. A magnetic tape 3 (indicated by an alternate long and short dash line) is obliquely wound around the peripheral surface of the drum 1 at a wrap angle of 90°. The magnetic tape 3 is laid between reel hubs 4A and 4B of a tape cassette and is moved at a speed of 8.15 mm/sec by a capstan 5 and a pinch roller 6.

Figure 2:
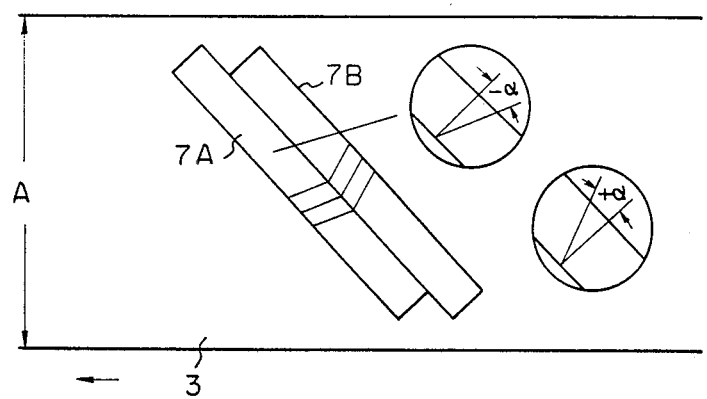
FIG. 2 is a schematic diagram showing a tape format of the digital tape recorder.

As the drum 1 is rotated, the magnetic heads 2A and 2B alternately come into contact with the magnetic tape 3, thereby forming oblique tracks 7A and 7B onto the magnetic tape 3 as shown in FIG. 2. A tape width A of the magnetic tape 3 is 3.81 mm. The magnetic gap of the rotary head 2A is inclined by an angle of inclination of $+\alpha$ with respect to the direction perpendicular to the track. The magnetic gap of the other rotary head 2B is inclined by an angle of inclination of $-\alpha$ with regard to the direction perpendicular to the track. The value of $\alpha$ is set to 20°. The angles of the magnetic gaps of the magnetic heads 2A and 2B are called +azimuth and −azimuth, respectively.

The magnetic heads 2A and 2B are alternately selected by a head change-over switch 8. The recording signal from a terminal r of a recording/reproducing switch 9 is supplied to the magnetic heads 2A and 2B through rotary transformers (not shown). The reproduced signals of the magnetic heads 2A and 2B are taken out to a terminal p of the switch 9 through the rotary transformers (not shown).

The analog audio signal from an input terminal 10 is supplied to an A/D converter 12 through a low pass filter 11 and converted into the digital audio signal (at a sampling frequency of 48 kHz on the basis of a linear digitization of 16 bits). The digital audio signal from the A/D converter 12 is supplied to a recording signal processor 13. In the processor 13, the digital audio signal is subjected to an error correction coding process and converted into the format of the recording data, which will be explained hereinafter. In this case, an ID signal (PCM-ID) to identify the on/off of the reemphasis of the signal to be recorded, the sampling frequency, the number of digitization bits, and the like are added. Sub codes such as a program number, a time code, and the like of the signal to be recorded, and an ID signal (sub code ID) for the sub codes are formed by a sub code encoder (not shown) and are supplied through a terminal 14 to the recording signal processor 13.

Serial recording data for each track is generated from the processor 13 synchronously with the rotation of the magnetic heads 2A and 2B. The recording data is supplied to the head change-over switch 8 through a recording amplifier 15 and the terminal r of the recording-/reproducing switch 9. The recording data is alternately supplied to the magnetic heads 2A and 2B by the switch 8.

During reproduction, the signals reproduced by the magnetic heads 2A and 2B are supplied to a reproducing amplifier 16 through the switch 8 and through a terminal p of the switch 9. The output signal of the reproducing amplifier 16 is supplied to a phase locked loop (PLL) 17. In the PLL 17, the clock signal synchronized with the reproduced signal is extracted. In a reproduction signal processor 18, the reproduced signal from the PLL 17 is subjected to the processes for error correction, interpolation, and the like. The reproduced digital audio signal is supplied to a D/A converter 19. The reproduced audio signal from the D/A converter 19 is taken out to an output terminal 21 through a low pass filter 20. Further, the sub codes and sub code ID are separated by the reproduction signal processor 18 and taken out to an output terminal 22. A sub code decoder is connected to the output terminal 22 and the control data and the like are formed from the sub codes.

Control signals to control the head change-over switch 8 and recording/reproducing change-over switch 9 are formed by a timing controller 23 from a PG pulse indicative of the rotation of the heads. In addition, the timing controller 23 generates clock signals and timing signals which are respectively necessary for the recording signal processor 13 and reproduction signal processor 18 using the clock signal, block sync signal, and the like from the PLL 17.

b. Data constitution of the digital tape recorder:

The whole part of the data to be recorded in a single track is called one segment. FIG. 3A shows a constitution of the data of one segment which is recorded by one rotary magnetic head. Assuming that a unit amount of the recording data is one block, the data of 196 blocks (7500 μsec) is included in one segment. Margins (eleven blocks) are provided in both end portions of one segment corresponding to the edge portions of the track, respectively. A sub code 1 and a sub code 2 are recorded in the portions adjacent to those margins, respectively. These two sub codes are the same data and this data is recorded twice. The sub code includes the program number and time code. A run-in interval (two blocks) of the PLL and a postamble interval (one block) are arranged on both sides of the recording area of eight blocks of each sub code.

An inter block gap in which no data is recorded is also provided. A pilot signal for the ATF is recorded in five blocks between the 3-block inter block gaps. The PCM signal which was subjected to the recording process is recorded in an area having a length of 128 blocks, i.e. excluding the run-in interval of the PLL of two blocks within an area having a length of 130 blocks of the central portion of one segment. The PCM signal is the data corresponding to the audio signal for the period of time when the rotary head rotates by only the amount corresponding to the half rotation of the drum 1.

The PCM signal consists of the two-channel stereophonic PCM signals of right (R) and left (L) channels and the parity data of the error detection/correction codes. When one segment shown in FIG. 3A is recorded and reproduced by the magnetic head 2A, the data is recorded in the left half portion of the PCM signal recording area and the data Ro is recorded in the right half portion. The data Le consists of the even-number designated data of the L channel and the parity data regarding this data. The data Ro consists of the odd-number designated data of the R channel and the parity data concerned with this data. The odd number and even number are the order numbers when they are counted from the beginning of the interleave block.

The data of one segment is recorded in the track which is formed by the other rotary magnetic head so as to have the same constitution as that of the track mentioned above. The data Re is recorded in the left half portion of the data interval in the data of one segment in the other track, and the data Lo is recorded in the right half portion. The data Re consists of the even-number designated data of the R channel and the parity data regarding this data. The data Lo consists of the odd-number designated data of the L channel and the parity data with respect to this data. In this manner, the even-number designated data and odd-number data of each channel are recorded in two adjacent tracks and at the same time, the data of the L and R channels is recorded in the same track. The reason why the data is recorded in this way is to prevent the possibility that the continuous data of the same channel might become error data due to dropout of the signal and the like.

FIG. 3B shows the data constitution of one block of the PCM signal. A block sync signal of eight bits (one symbol) is added to the head of one block. Then, a PCM-ID of eight bits is added. After the PCM-ID, a block address is added. A simple parity error correction coding process is performed with respect to two symbols ($W_1$ and $W_2$) of the PCM-ID and block address. An eight-bit parity is added after the block address. As shown in FIG. 3D, the block address is constituted by seven bits excluding the most significant bit (MSB). When the MSB is set to "0", this means that this block is the PCM block.

The block address of seven bits sequentially changes such as (00) to (7F) (hexadecimal notation). The PCM-ID which is recorded in each of the blocks of the block addresses whose lower three bits are (000), (010), (100), and (110) is predetermined. The optional code of the PCM-ID can be recorded as each of the block addresses in which the lower three bits are (001), (011), (101), and (111). The PCM-ID includes $ID_1$ to $ID_8$ each consisting of two bits and a frame address of four bits. The identification information is defined for each of $ID_1$ to $ID_7$. One pack is constituted by thirty-two $ID_8$. For example, the $ID_1$ is the format ID. The kind of application is identified by the $ID_1$ to designate if it is used for audio or for other purposes. The on/off of the preemphasis and the characteristics thereof are identified by the $ID_2$. The sampling frequency is identified by the $ID_3$. Each of the $ID_1$ to $ID_7$ and the frame address are segments of the interleave pair and are the same data.

FIG. 3C shows the constitution of the data of one block of the sub codes. This data constitution is similar to that of the foregoing PCM block. As shown in FIG. 3E, the MSB (most significant bit) of the symbol $W_2$ of the sub code block is "1" and this means that the block is the sub code block. The lower four bits of the symbol $W_2$ are used as the block address. Eight bits of the symbol $W_1$ and three bits in the symbol $W_2$ excluding the MSB and the block address are used as the sub code ID. With respect to two symbols ($W_1$ and $W_2$) of the sub code block, a simple parity error correction coding process is performed and a parity of eight bits is added.

Figure 4A:
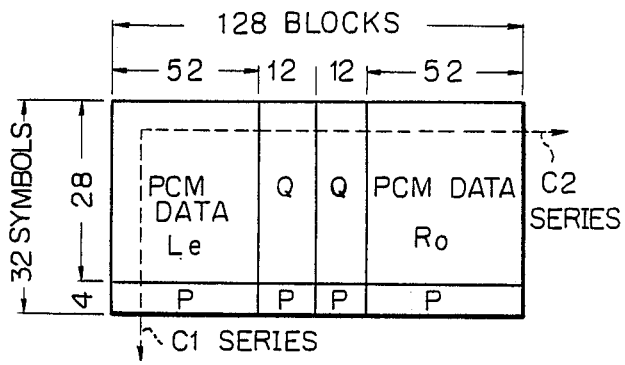
FIGS. 4A and 4B are schematic diagrams for explaining error correction codes of the digital tape recorder.
Figure 4B:
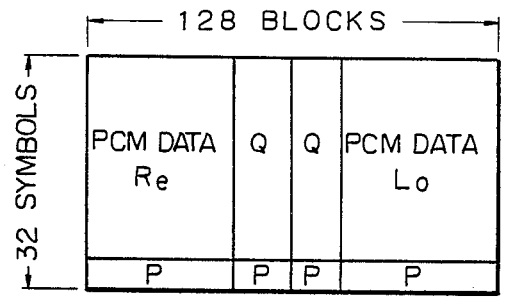

The different data is recorded as the sub code ID in the even-number designated block addresses (the LSB (least significant bit) of each block address is "0") and in the odd-number designated block addresses (the LSB of each block address is "1"). The sub code ID includes the control ID to designate the reproducing method, the time code, and the like. The sub code data is subjected to an error correction coding process using a Reed Solomon code in a manner similar to the PCM data.

c. Error correction codes of the digital tape recorder:

The processes of the error detection/correction codes are executed for the data of each one of the 128 blocks to be recorded in one segment. FIG. 4A shows a code constitution of the data to be recorded by the magnetic head 2A. FIG. 4B shows a code constitution of the data to be recorded by the other magnetic head 2B. The PCM signal in which the number of digitization bits is sixteen is divided into an upper eight bits and a lower eight bits, and the coding processes of the error detection/correction codes are performed in a manner such that eight bits are used as one symbol.

The data of 4096 ($=128\times32$) symbols is recorded in one segment. As shown in FIG. 4A, the $C_1$ and $C_2$ error correction coding processes are executed with respect to each of the vertical and horizontal directions of the two-dimensional arrangement of the data consisting of the even-number designated data Le of the L channel comprising the symbols of ($L_0, L_2, \ldots, L_{1438}$) and the odd-number designated data Ro of the R channel Comprising the symbols of ($R_1, R_3, \ldots, R_{1439}$). The coding process of the $C_1$ code using the Reed Solomon code of (32, 28, 5) is performed with regard to the twenty-eight symbols in the vertical direction. The parity data P of four symbols of the $C_1$ code is arranged at the last position of the two-dimensional arrangement. The coding process of the $C_2$ code using the Reed Solomon code of (32, 26, 7) is performed with regard to the fifty-two symbols in the horizontal direction. The coding process of the $C_2$ code is performed on every two symbols among the 52 symbols, i.e. on 26 symbols. The parity data Q consisting of six symbols is generated with respect to one code series. The parity data Q consisting of a total of twelve symbols of the $C_2$ code is arranged in the central portion of the two-dimensional arrangement. Similarly, the coding process of the $C_2$ code is also executed with regard to the symbols of the other 52 PCM data in the horizontal direction and the parity data Q is arranged in the central portion.

The code constitution shown in FIG. 4B is obtained by replacing the even-number designated PCM signals of the L channel in the code constitution shown in FIG. 4A by the even-number designated PCM signals ($R_0, R_2, \ldots, R_{1438}$) of the R channel and by replacing the odd-number designated PCM signals of the R channel by the odd-number designated PCM signals ($L_1, L_3, \ldots, L_{1439}$) of the L channel.

As shown in FIG. 3B, one PCM block is constituted by adding the sync signal, PCM-ID, block address, and parity to the 32 symbols arranged in the vertical direction in those code constitutions.

d. Reproduction signal processor:

The present invention is applied to the writing of the reproduced data into a buffer RAM in the reproduction signal processor 18 of the rotary head type digital tape recorder mentioned above and to the $C_1$ decoding.

The rotary head type digital tape recorder is constituted in a manner such that a pair of rotary magnetic heads 2A, 2B which are arranged so as to face each other at an angular interval of 180° are alternately brought into contact with the magnetic tape which is wound at a wrap angle of 90°. Therefore, as shown in FIG. 5A, on play back the data is alternately reproduced from the pair of rotary heads for the period of time corresponding to the rotational angle of every 90° in one rotation (360°) of the rotary head.

Figure 6:
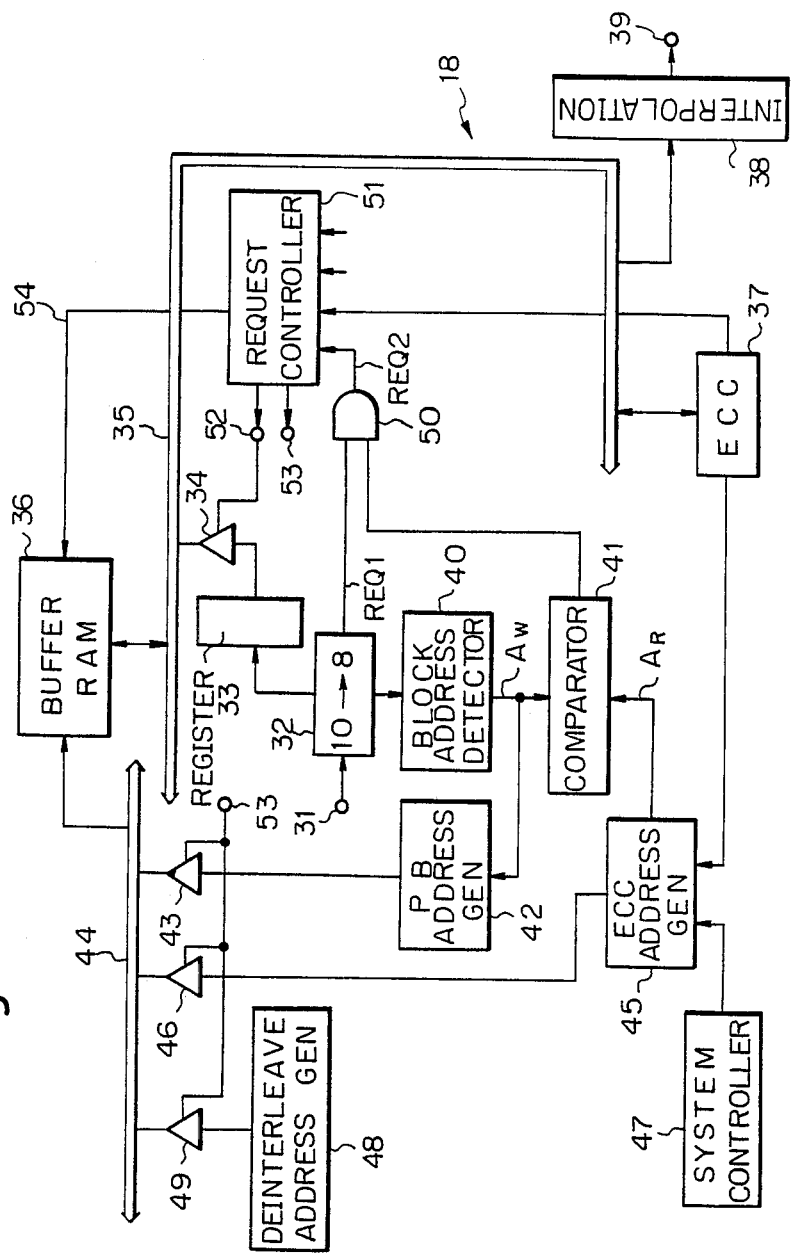
FIG. 6 is a time chart for explaining the operation of the embodiment of the invention.

FIG. 6 shows the constitution of the reproduction signal processor 18. In overview, the reproduced data is written into a buffer memory 36 in accordance with a block address $A_W$ in the reproduced data for each symbol of the data. When a certain amount of reproduced data is written, the data which has already been written is read out in parallel with the writing operation. $C_1$ decoding is performed with respect to the data read out as shown in FIG. 5B. The PCM signal which was error corrected by the $C_1$ decoding is written into the buffer memory 36 and at the same time, the pointer ($C_1$ pointer) generated by the $C_1$ decoding is written into the buffer memory 36. After completion of the $C_1$ decoding, the check symbols (parity data P) of the code $C_1$ in the reproduced data are unnecessary data. Therefore, the pointer in the $C_1$ decoding is written into the area in the buffer memory 36 where the parity data P was stored. After the $C_1$ decoding is performed, $C_2$ decoding is executed using the PCM signals, the check symbols (parity data Q) of the code $C_2$, and the $C_1$ pointer which are stored in the buffer memory 36. The decoded data, after deinterleaving and interpolation is supplied to a D/A convertor to produce an analog signal.

The details of FIG. 6 will now be described. The reproduced signal is supplied to an input terminal 31 from the phase locked loop 17 (FIG. 1). The reproduced signal is supplied to a demodulator 32 and one symbol and ten bits are demodulated into one symbol and eight bits. When recording the data on the magnetic tape 3, eight bits of one symbol are subjected to the digital modulating process so as to be converted into a preferable ten-bit pattern in order to reduce the low frequency component as little as possible. Each symbol of the reproduced data from the demodulator 32 is supplied to a data bus 35 through a data register 33 and a buffer 34.

A buffer RAM 36 and an error correcting circuit 37 are connected to the data bus 35. As will be explained in further detail hereinafter, the reproduced data is stored into the buffer RAM 36 from the data bus 35. This stored data is supplied to the error correcting circuit 37, on command, via the data bus 35. In the error correcting circuit 37, the data stored in the buffer RAM 36 is subjected, successively, to the error correcting processes ($C_1$ decoding and $C_2$ decoding) by use of the Reed Solomon code. The PCM signals of the tracks A and B after the $C_1$ and $C_2$ decoding processes are finished are read out of the buffer RAM 36 in accordance with the original order. In this case, the two-channel stereophonic signals are formed by the PCM signals which were respectively reproduced from the tracks A and B and were error corrected. A deinterleave address generator 48 is provided to read out the error corrected PCM signals from the buffer RAM 36. The address formed by the deinterleave address generator 48 is supplied to the buffer RAM 36 through a buffer 49 and the address bus 44. The PCM signal read out of the buffer RAM 36 is supplied to the interpolating circuit 38 via the data bus 35.

In the interpolating circuit 38, the uncorrectable errors are interpolated by any of several known ways, such as mean value interpolation (primary interpolation), nth-order interpolation or 0th-order interpolation (holding of the previous value). The reproduced PCM signal is taken out to an output terminal 39 connected to the interpolating circuit 38. The reproduced PCM signal is supplied from the output terminal 39 to the D/A converter 19 (refer to FIG. 1). The sub codes are subjected to the error correction processes and the like by a sub code decoder (not shown) and taken out to an output terminal 22 (refer to FIG. 1) of the sub code decoder (not shown).

A block address detecting circuit 40 is provided in conjunction with the demodulator 32. During reproduction of the recorded signal, a reproduced block address $A_W$ is read by the block address detecting circuit 40. The reproduced block address $A_W$ is supplied to a comparator 41 and a reproduction address generator 42. From the block address $A_W$ the reproduction address generator 42 generates a reproduction address which is supplied to an address bus 44 through a buffer 43. The reproduction address obtained through the address bus 44 becomes the address signal of the buffer RAM 36. The reproduction block address $A_W$ is the address to sequentially write the reproduced data of one segment (32 symbols × 128 blocks) (refer to FIGS. 4A and 4B) for each block from the first block to the 128th block.

Reference numeral 45 denotes an address generator for the ECC (error correcting circuit). The address formed by the ECC address generator 45 is supplied to the buffer RAM 36 through a buffer 46 and the address bus 44. The address for the ECC is the address to read out the data for the respective $C_1$ and $C_2$ decoding from the buffer RAM 36 and the address to write the error corrected data and pointer into the buffer RAM 36. A corresponding read block address AR produced by the ECC address generator 45 is supplied to the comparator 41. Control signals such as a correction completion signal and the like are supplied from the error correcting circuit 37 to the generator 45. Start signals to instruct the start of the processes of the respective $C_1$ and $C_2$ decoding are also supplied from a system controller 47 to the ECC generator 45.

Upon $C_1$ decoding, each block of data (PCM signals and parity data P) of the $C_1$ series which has been previously written is read out of the buffer memory 36 using the reproduction address. This data is error corrected by the error correcting circuit 37. The corrected PCM signal and the $C_1$ pointer are written back into the same block address in the buffer RAM 36. The $C_1$ pointer is written into the memory area where the parity P had been previously written. The foregoing error correcting processes are executed with respect to all of the $C_1$ series. The ECC address generator 45 generates the read address and write address in the foregoing $C_1$ decoding.

For $C_2$ decoding, the stored PCM signal which was subjected to the $C_1$ decoding, the $C_1$ pointer, and the parity data Q are read out of the buffer memory 36 for each $C_2$ series and then subjected to the $C_2$ decoding process in the error correcting circuit 37. The PCM signal after error correction by the $C_2$ decoding, and the $C_2$ pointer are written into the buffer RAM 36. In this $C_2$ decoding the necessary read address and write address are also formed by the ECC address generator 45.

As stated earlier in this specification, one purpose of the present invention is to prevent the error corrected data stored in memory from being written over by subsequently reproduced, but not as yet error correction decoded data. To accomplish this objective, the block address $A_R$ which was formed by the ECC address generator 45 and used to read out the data from the buffer RAM 36 is supplied to the comparator 41. In the comparator 41, the magnitude of the reproduction block address $A_W$ is compared with the magnitude of the read block address $A_R$. The comparison output of the comparator 41 becomes "1" when ($A_W > A_R$) and becomes "0" when ($A_W \leq A_R$). The comparison output of the comparator 41 is supplied to an AND gate 50.

A write request signal REQ1 is supplied from the demodulator 32 to the AND gate 50 for each symbol of the reproduced data. A write request signal REQ2 which is generated from the AND gate 50 is supplied to a request controller 51. The request controller 51 generates a control signal 54 to control the writing into and reading out from the buffer RAM 36, a control signal (from an output terminal 52) to the buffer 34 connected to the data bus 35, and a control signal (an output terminal 53) to the buffers 43, 46, and 49 connected to the address bus 44. In addition to the write request signal $REQ_2$ from the AND gate 50, a request signal from the error correcting circuit 37, a request signal regarding the sub codes, and the like are supplied to the request controller 51. When the write request signal $REQ_2$ from the AND gate 50 is supplied to the request controller 51, the control signal 54 to set the buffer RAM 36 into the writable state is generated from the request controller 51, thereby allowing the reproduced data to be written. If the write request signal $REQ_2$ is inhibited by the AND gate 50, the reproduced data is not written.

The operation of the embodiment of the invention mentioned above will now be described with reference to FIGS. 7A to 7F. FIG. 7A shows a timing signal formed by the demodulator 32 on the basis of the detection of the block sync signal in the reproduced signal. FIG. 7B shows the write request signal $REQ_1$ generated from the demodulator 32. The write request signal $REQ_1$ is generated synchronously with each symbol included in one block. The reproduction block address $A_W$ detected by the block address detecting circuit 40 sequentially changes such as n, n+1, . . . as shown in FIG. 7C.

For example, when the reproduction block address $A_W$ is n, the block address $A_R$ for the $C_1$ decoding starts from 0. Therefore, the comparator 41 generates the comparison output of "1" as shown in FIG. 7F since $(A_W > A_R)$. In response to the comparison output of "1", the write request signal $REQ_1$ is transmitted through the AND gate 50 and the write request signal $REQ_2$ shown in FIG. 7E is supplied to the request controller 51. The reproduced data is written into the buffer memory 36 by the write request signal $REQ_2$. If $(A_W \leq A_R)$, the comparison output becomes "0" and the write request signal $REQ_2$ is inhibited. Therefore, the reproduced data in this block address is not written into the buffer RAM 36.

The state of $(A_W \leq A_R)$ is the abnormal state which is caused due to an erroneous reading of the block address $A_W$ or the like. Inhibiting the writing of the reproduced data prevents writing the reproduced data over the $C_1$ decoded PCM signal and the $C_1$ pointer which are stored in the buffer RAM 36. For the data of one segment, if the block address $A_W$ was erroneously read then that block of data is not written and the data in this block is processed as error data and is corrected by the $C_2$ decoding or other proper data is produced by the interpolation.

The present invention is not limited to the foregoing rotary head type digital tape recorder but may be also applied to other apparatuses for reproducing digital information signals (digital audio signals, digital video signals). Also the constitution of the error correction code is not limited to those shown in FIGS. 4A and 4B but may be a constitution such that the coding processes of the error correction codes are performed in the oblique direction of the arrangement of the PCM signals as well as the vertical or lateral direction of the PCM signals arranged in a matrix form.

According to the present invention, the process to write the reproduced data into the buffer memory and the decoding process to read out the data written in the buffer memory therefrom and to error correct this data and to write the corrected data into the buffer memory are executed in parallel, so that the decoding time is reduced. In addition, according to this invention, it is possible to prevent the reproduced data from being written into the address where the error corrected data is stored. The generation of an abnormal reproduced signal can be prevented with certainty.

Although the present invention has been shown and described with respect to a preferred embodiment, various changes and modifications which are obvious to a person skilled in the art to which the invention pertains are deemed to lie within the spirit and scope of the invention.

What is claimed is:

1. A decoding apparatus for decoding input data which was error correction coded, comprising:
   memory means for storing data;
   writing means for writing said input data into said memory means;
   detecting means supplied with said input data for detecting a write address having a first predetermined numerical magnitude and supplying the detected write address to the writing means to cause it to write the input data into said memory means at the detected write address;
   decoding means for producing a decoding address having a second predetermined numerical magnitude, reading out the data stored in said memory means at said decoding address, and decoding the read out data;
   comparing means for comparing the numerical magnitude of said write address with that of said decoding address; and
   control means connected to said comparing means and said writing means for inhibiting the writing means from writing the input data into said memory means when it is detected by said comparing means that the numerical magnitude of the decoding address is not less than that of said write address.

2. A decoding apparatus according to claim 1, wherein:
   said detecting means further includes means for detecting a synchronizing signal from the input data and means for generating a write request pulse to the writing means corresponding to each symbol of the input data in response to said synchronizing signal;
   said writing means includes means for controlling the writing of the input data into said memory on the basis of said write request pulse; and
   wherein said control means includes preventing means for preventing said write request pulse from being supplied to said write control means when it is detected by the comparing means that the numerical magnitude of the decoding address is not less than that of said write address.

3. A decoding apparatus for decoding input data which was divided into predetermined intervals and subjected to a plurality of error correction coding processes, comprising:
   memory means;
   writing means for writing said input data into the memory means; and
   first decoding means for decoding the divided input data, using a first code, in parallel during the time interval when said data is being written into the memory means.

4. A decoding apparatus according to claim 3, further comprising second decoding means for decoding using a second code after the decoding using the first code by the first decoding means.

5. A decoding apparatus according to claim 3, wherein the error correction code for said divided data is a product code.

6. A decoding apparatus according to claim 3, further comprising:
   detecting means supplied with said input data for detecting a write address having a first predetermined numerical magnitude and supplying the detected write address to the writing means to cause it to write the input data into said memory means;
   decoding means for producing a decoding address having a second predetermined numerical magnitude, reading out the data stored in said memory means at said decoding address, and decoding it;
   comparing means for comparing the numerical magnitude of said write address with that of said decoding address; and
   control means connected to said comparing means and said writing means for inhibiting the writing means from writing the input data into said memory means when it is detected by said comparing means that the numerical magnitude of the decoding address is not less than that of said write address.

7. A decoding apparatus according to claim 6, wherein said divided data is intermittently recorded on a tape and said decoding apparatus further comprises:
   a rotary head for reproducing the data from said tape;
   the detecting means further includes means for detecting a synchronizing signal from the reproduced data from said rotary head and for generating a write request pulse to the writing means corresponding to each symbol of the input data;
   the writing means includes means for controlling the writing of the input data into the memory means on the basis of said write request pulse; and
   wherein said control means includes means for preventing the write request pulse from being supplied to said write control means when it is detected by the comparing means that the numerical magnitude of the decoding address is not less than that of the write addresses.

* * * * *